United States Patent
Ferreira et al.

(10) Patent No.: US 12,422,412 B2
(45) Date of Patent: Sep. 23, 2025

(54) METHOD FOR ASSESSING LEVEL OF INCLUSIONS IN STEEL TUBES USING HIGH FREQUENCY TRANSDUCER IN THE AUTOMATIC ULTRASOUND INSPECTION

(71) Applicant: VALLOUREC TUBOS DO BRASIL LTDA., Belo Horizonte (BR)

(72) Inventors: Amarildo Jose Ferreira, Belo Horizonte (BR); Edson Jose Eufrásio, Belo Horizonte (BR); Fabricio Araujo Torres, Belo Horizonte (BR)

(73) Assignee: VALLOUREC TUBOS DO BRASIL LTDA., Belo Horizonte (BR)

( * ) Notice: Subject to any disclaimer, the term of this patent is extended or adjusted under 35 U.S.C. 154(b) by 531 days.

(21) Appl. No.: 17/263,018

(22) PCT Filed: Jul. 18, 2019

(86) PCT No.: PCT/BR2019/050285
§ 371 (c)(1),
(2) Date: Jan. 25, 2021

(87) PCT Pub. No.: WO2020/019045
PCT Pub. Date: Jan. 30, 2020

(65) Prior Publication Data
US 2021/0172911 A1      Jun. 10, 2021

(30) Foreign Application Priority Data

Jul. 26, 2018    (BR) .......................... 102018015331-5

(51) Int. Cl.
*G01N 29/275*    (2006.01)
*G01N 29/04*     (2006.01)
*G01N 29/11*     (2006.01)

(52) U.S. Cl.
CPC ......... *G01N 29/275* (2013.01); *G01N 29/043* (2013.01); *G01N 29/11* (2013.01); *G01N 2291/0234* (2013.01)

(58) Field of Classification Search
CPC .... G01N 29/275; G01N 29/043; G01N 29/11; G01N 2291/0234
See application file for complete search history.

(56) References Cited

U.S. PATENT DOCUMENTS 3,672,210 A * 6/1972 Cressman ............ G01N 29/262
                                                    73/612
3,961,522 A * 6/1976 Kilen ..................... G01N 29/30
                                                    73/609

(Continued)

FOREIGN PATENT DOCUMENTS

| AU | 2020220106 | 9/2020 |
| CA | 2870206 | 11/2013 |

(Continued)

OTHER PUBLICATIONS

Machine translation of CN206038623U (Year: 2017).*

(Continued)

*Primary Examiner* — Lee E Rodak
*Assistant Examiner* — Sangkyung Lee
(74) *Attorney, Agent, or Firm* — Sheridan Ross P.C.

(57) ABSTRACT

The present invention refers to a method for assessing the level of inclusions in steel tubes using high frequency transducer (2) in the automatic ultrasound inspection, characterized in that it comprises the steps of: transporting a tube (1) through a bed (10) to an acoustic coupling unit (3); coupling the acoustic coupling unit (3) with the tube (1) through a radial movement (16) of transducer approximation (2) regarding the tube external surface (1); detecting inclusions information in at least one sweep region (11) along the length of the tube (1); sending the inclusions information to (Continued)

a sonic emitting and receiving unit (9); determining an inclusions index for the tube (1) or specific region; continuing the tube transportation (1) in an inspection line; and giving continuity to the inspection cycle with the next tube (1) in the production flow.

14 Claims, 1 Drawing Sheet

(56) References Cited

U.S. PATENT DOCUMENTS

| | | | |
|---|---|---|---|
| 5,216,622 A | * | 6/1993 | Kibblewhite .......... G01N 29/07 73/761 |
| 2004/0016299 A1 | | 1/2004 | Clascock et al. |
| 2009/0126492 A1 | | 5/2009 | Sato |
| 2010/0307249 A1 | | 12/2010 | Lesage et al. |
| 2011/0257903 A1 | | 10/2011 | Imbert et al. |

FOREIGN PATENT DOCUMENTS

| | | | | |
|---|---|---|---|---|
| CN | 102879472 | | 1/2015 | |
| CN | 104335038 | | 2/2015 | |
| CN | 104634876 | | 5/2015 | |
| CN | 206038623 U | * | 3/2017 | |
| CN | 105722615 | | 10/2020 | |
| EP | 2157425 | | 2/2010 | |
| JP | H06-213875 | | 8/1994 | |
| RU | 2621216 | | 6/2017 | |
| WO | WO 01/96855 | | 12/2001 | |
| WO | WO2001096855 A1 | * | 12/2001 | |
| WO | WO 2014/143258 | | 11/2014 | |
| WO | WO-2016156262 A1 | * | 10/2016 | ............. G01N 29/30 |
| WO | WO-2018234678 A1 | * | 12/2018 | ........... G01N 29/043 |

OTHER PUBLICATIONS

Machine translation of WO2001096855A1 (Year: 2001).*
Machine translation of WO2018234678A1 (Year: 2018).*
Machine translation of WO2016156262A1 (Year: 2016).*
International Search Report and Written Opinion for International (PCT) Patent Application No. PCT/Br2019/050285, dated Sep. 20, 2019, 12 pages.
Darmon et al. "An integrated model to simulate the scattering of ultrasounds by inclusions in steels," Ultrasonics, Apr. 2004, vol. 42, No. 1-9, pp. 237-241.
HERING "Ultraschall-gepruefte stahlreinheit verfahren feur die praxis, Ergebnisse aus der praxis," HTM Haerterei Technische Mitteilungen: Zeitschrift Fuer Werkstoffe, Waermebehandlung und Fertigung, Carl Hanser Verlag, Munchen, DE, Jul. 1999, vol. 54, No. 4, pp. 259-265.

* cited by examiner

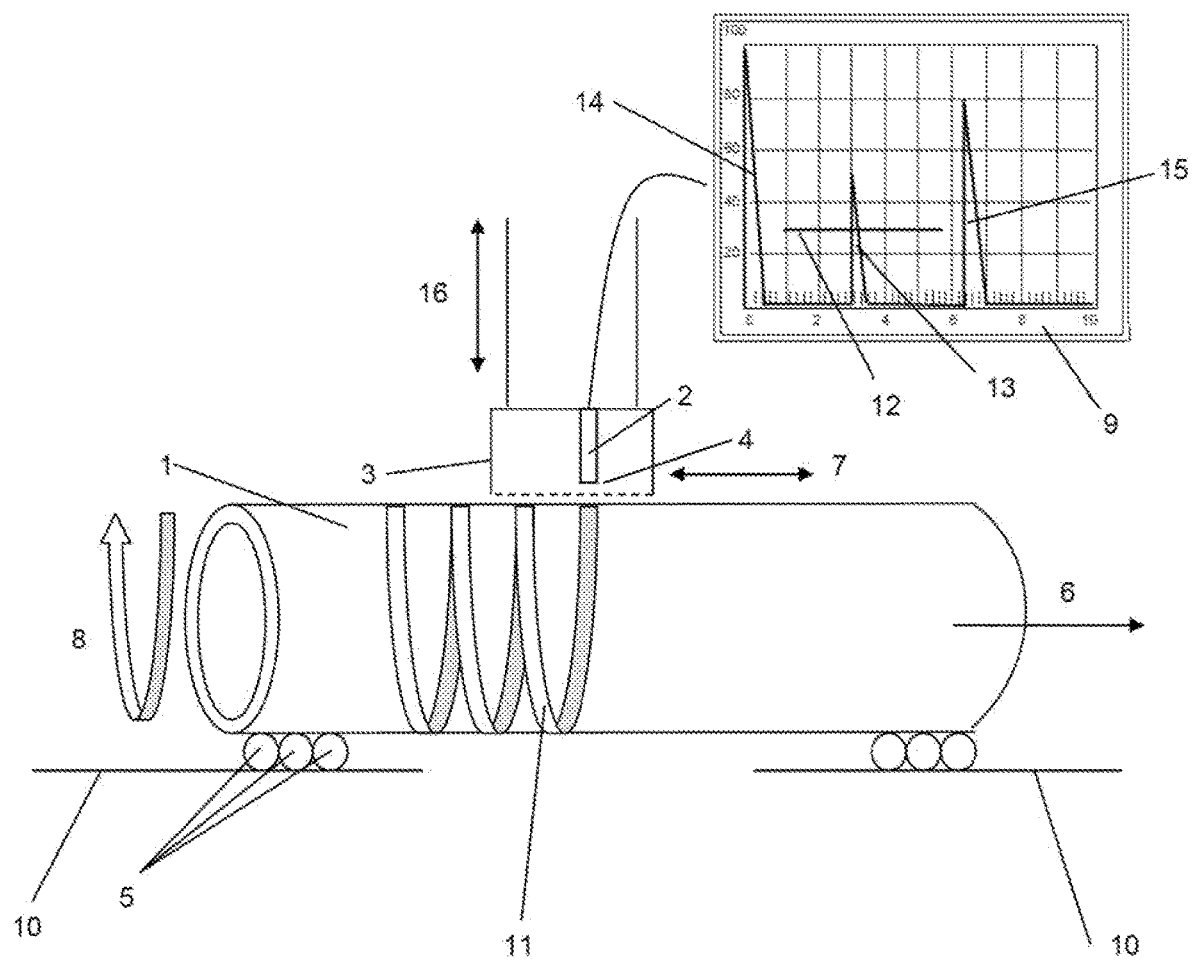

METHOD FOR ASSESSING LEVEL OF INCLUSIONS IN STEEL TUBES USING HIGH FREQUENCY TRANSDUCER IN THE AUTOMATIC ULTRASOUND INSPECTION

CROSS REFERENCE TO RELATED APPLICATIONS

This application is a national stage application under 35 U.S.C. 371 and claims the benefit of PCT Application No. PCT/BR2019/050285 having an international filing date of 18 Jul. 2019, which designated the United States, which PCT application claimed the benefit of Brazilian Patent Application No. BR102018015331-5 filed 26 Jul. 2018, the contents of each of which are incorporated herein by reference in their entireties.

The present invention relates to a method of using the non-destructive ultrasonic test for assessing macropurity in steel tubes through the use of a high frequency ultrasonic transducer simultaneously with automatic ultrasonic inspection defined by standards and/or customer specifications for the detection of internal, external, laminar and surface discontinuities, and thickness measurement, serving as an auxiliary tool to control and improve the steelmaking process by correlating the macropurity levels obtained in the ultrasonic test of the tubes with the parameters and conditions adopted in the steelmaking process, as well as the results obtained in the corrosion tests of the final product, when applicable.

DESCRIPTION OF THE PRIOR ART

The market demand for steadily increasing steel tubes, premium products, and high purity indices of steel has grown considerably in recent years, among other reasons, due to the high degree of quality required and more severe applications in the oil and gas industry. Non-destructive testing plays an extremely important role in ensuring that these market requirements are met. Different types of non-destructive tests are currently carried out in order for the tubes produced to meet the necessary requirements for inclusion purity and density in steel.

The production process of the steel blocks and the tubes manufacturing process, either by hot rolling or drawing, can generate numerous discontinuities in the external or internal surfaces of the tube or even in the middle of the volume tested, which can affect or affect the quality of the final product. A feature of the steelmaking process is the presence of inclusions, particles of compounds with different chemical compositions (oxides, sulphides, silicates, nitrides and other types) that can arise in the middle of the matrix of the different types of steel, which can result in different implications for the quality of the steel tube depending on its application.

In practice it is customary to divide the inclusions by their size into micro, meso and macroinclusions, which depending on the type and size may represent harmful effect to the application of the product. A steel tube containing inclusions above acceptable levels may be detrimental to the metal alloy when its presence adversely interferes with its mechanical strength or corrosion, since the inclusions have different chemical and mechanical characteristics than the characteristics of the steel, be reduced to acceptable levels.

As is well known in the application of non-destructive tests, there are different systems for the evaluation of superficial and/or volumetric discontinuities, including macroinclusions, in steel tubes using the ultrasonic test with the application of semi-immersion technique or complete immersion with transducers high frequency. Most of these applications for the evaluation of macroinclusions consider the execution of the ultrasound test in a reduced sampling of the block or tube in relation to the total volume of the steel produced in the steelmaking process campaign, and may therefore present nonrepresentative results in relation to the total volume of steel produced as a function of the variables of the manufacturing process. In addition, these evaluation systems are not carried out in-line in the production flow, and it is not possible to have the results of macropurity simultaneously with the production and inspection.

An example of a volumetric discontinuity analysis system is known in WO2001096855 which discloses a system of automatic detection of subhorizontal defects in steel tubes, which comprises: applying to the tube a periodic pulsed ultrasonic beam In and capturing the reflected echo signals Dv, Ds. The document presents a construction of a time curve, called the dynamic echo curve (ECHODYN), of the intensity levels of the echoes in parts of intervals and analysis of the variations of the curve, in order to establish a correlation of at least two elemental peaks, indicating the presence of subhorizontal defects. The document considers the use of transducers with oblique incidence in relation to the tube that captures the echo of the signal to calculate the dynamic echo curve. The document reveals that it can identify significant longitudinal and transverse defects located on the outer or inner surfaces of the tube or planar faults (double lamination) in the volume tested. However, the document states that the transducer must be angled relative to the surface of the tube and only identifies a defect through two peaks of detected echo signals, setting up a complex dynamic echo curve.

But document PI0821312-7 discloses a device that represents an auxiliary tool for the non-destructive control of steel products, in order to obtain information about possible imperfections of the product, from return signals captured by ultrasonic transducers, emitters and receivers, forming a arranged in ultrasonic coupling with the product by means of a liquid medium (coupling), with relative rotation/translation movement between the tube and the arrangement of transducers. The document discloses that a plurality of transducers are required to realize the formation of a 3D map of the metal to be tested for screening and classification of various defects through a robust, heavy and difficult installation mechanism, merely to feed back the processes with information on the imperfections detected in the products through neural networks.

Document PI0615382-8 discloses an ultrasonic test equipment and technique capable of rapidly detecting faults having various angles of inclination with respect to an axial direction of a tubular test object with high accuracy. The invention requires a plurality of transducers at different angles where various complementary equipment is required so that the respective signals are captured efficiently making the equipment expensive and difficult to maintain. As is known from the state of the art non-destructive testing industry, the current testing technology using Phased Array through electronic resources enables variation of the sonic angle and hence the detection of discontinuities at different angles. Document PI0615382-8 is restricted to the detection of discontinuities with different angles from the axial direction of the test material.

OBJECTIVES OF THE INVENTION

It is the object of the present invention to establish a method for evaluating the inclusion level in steel tubes using high frequency transducer in automatic ultrasonic inspection as an auxiliary tool in the process control of the steel manufacturing. This evaluation will be carried out quickly considering that it occurs simultaneously with the automatic ultrasonic inspection of the tubes for the detection of discontinuities, and also in a simple way due to the use of a normal transducer with longitudinal waves, representing an excellent correlation of cost X benefit. The evaluation will be done individually for each tube produced, allowing an overall assessment of the inclusional level of the entire steel volume of the steelmaking process. The present invention may be applicable to any steel tube manufacturing plant by adapting the automatic ultrasonic inspection units with the installation of the high frequency and electronic transducers for acquisition and processing of the signals resulting from the presence of macroinclusions.

It is a further object of the present invention to provide that the macroinclusion analysis method is used online during the automatic ultrasonic test of the steel tubes being adaptable to any tube making plant capable of application to any grade of steel.

Additionally, it is also the object of the invention to determine a macropurity index that is customizable as a function of the application and criticality of the product, processing conditions during steel manufacturing, and specific needs of each tube mill for controlling the steelmaking process. The results can be used to control and improve the steelmaking process, or as an internal control of the steel tube manufacturer to segregate products according to the limits established by the steel tube manufacturer.

BRIEF DESCRIPTION OF THE INVENTION

The method for assessing the level of inclusions in steel tubes using high frequency transducer in the automatic ultrasound inspection of the present invention comprises a first step of transporting the tube through the bed to the acoustic coupling unit. The speed of the tube transportation through the bed may be adjusted to ensure the stabilization of the acoustic coupling in the ends and along the length of the tube.

Next, it is performed a step de coupling the acoustic coupling unit with the tube through a radial movement of transducer approximation regarding the tube external surface.

After coupling, it is performed a step of detecting inclusions information in at least one sweep region along the length of the tube. The sweep region is defined by the region where the test sweep is performed and may be a specific region or a helical trajectory along the whole length of the tube. But the detection of inclusions information is performed by outputting a sonic beam by the ultrasonic transducer, which performs the detection of inclusions information and may operate a nominal frequency preferably of 15 MHz.

Next, the inclusions information is sent to the sonic emitting and receiving unit. These inclusions information us defined by the number of sonic pulses with signals with amplitudes above the monitoring threshold of inclusions.

The method comprises also a step of determining the inclusions index for the tube or specific region based on the amplitudes of the signals of inclusions with amplitudes above the monitoring threshold of the signals of inclusions. The inclusions index is determined by the emitting and receiving unit of sonic pulses.

Finally, the tube transportation continues in an inspection line and the inspection cycle continues with the next tube in the production flow.

In addition, the individual results of the pipe inclusion indices are correlated with the processing conditions in the steel manufacturing stage, representing a tool for monitoring the steel purity and continuous improvement in the steelmaking process.

The individual results of the pipe inclusion indices are also correlated with the corrosion test results required by pipe manufacturing and supply standards, representing a tool for monitoring and improving the corrosion resistance of steel.

BRIEF DESCRIPTION OF THE DRAWINGS

The present invention will be then more detailed described.

FIG. 1—according to the invention, FIG. 1 is a diagram of an embodiment of the evaluation system of inclusions during the step of the production flow of automatic autosomal inspection of a steel tube.

DETAILED DESCRIPTION OF THE DRAWINGS

In FIG. 1, it is shown the system according to the invention in a preferred embodiment, comprising a bed 10 for tube transportation 1 during its step of automatic ultrasonic inspection of manufacturing, an acoustic coupling unit 3, which is filled with a liquid mean of acoustic coupling 4, and has at least one ultrasonic transducer of high frequency 2 arranged immersed in liquid medium of acoustic coupling 4 and an sonic emitting and receiving unit 9, which operates with a determined Frequency of Pulse Repetition. The high frequency ultrasonic transducer 2 has a piezoelectric crystal capable of generating sound waves (mechanical energy) when receiving electric pulses, and the inverse effect, that is, generate electric energy when receiving sound waves, and must operate preferably at 15 MHz, which results in a detectability of inclusions with approximate dimensions starting at 0.20 mm.

The acoustic coupling liquid medium 4 should preferably be water as a function of the cost benefit ratio, and serves to ensure that the sonic energy propagates from the ultrasonic transducer 2 to the test tube 1. The acoustic coupling is ensured by the positioning of the acoustic coupling unit 3 adjacent to the surface of the tube 1 with constant supply of the liquid medium ensuring a column of the acoustic coupling between the tube 1 and the ultrasonic transducer 2. The system is capable of monitoring the acoustic coupling, ensuring the effectiveness of the evaluation of inclusions.

The transport bed 10 comprises the rollers 5 which transmit the rotational movement and/or transport the tube 1 during the test. The test sweep 11 is described by the helical conveying of the tube 1, rotational movement 8 of the tube simultaneously with displacement in the axial direction 6, or further by the rotational movement of the tube 1 with displacement in the axial direction 7 of the acoustic coupling unit 3. In both transport configurations, the rotational speeds and axial displacement must be defined and adjusted depending on the desired sweep 11, physical conditions of the tube, such as straightness, surface finish, finish of the ends, etc. these speeds are reduced when the coupling unit is at the ends of the tube to enable stabilization of the acoustic coupling liquid medium 4 of the acoustic coupling unit 3, thus the present invention is adaptable to any automatic ultrasonic tube inspection unit. The adjustment of the axial and rotational velocity of the tube must also be defined as a function of the Pulse Repetition Frequency, so that the distance between two sequential sonic pulses is limited and compatible with the desired pulse density for assessing the presence of inclusions. The distance between two sequential pulses should preferably be limited to a maximum of 2 mm in order to provide a sufficient pulse density for detection of the inclusions.

The test sweep 11 will be effected along the length of each individually tested tube 1 by relative displacement of the high frequency ultrasonic transducer 2 along the length of the tube 1 with radial movement 16 simultaneous with the displacement of the high frequency transducer. The test sweep 11 will be performed statistically along the length of the tube, considering that the relative axial displacement between the high frequency transducer and the tube at each revolution will be greater than the sonic beam width in the volume tested, but it is representative of the level of individual inclusions of the test tube. If a larger test sweep 11 is intended, either at one or both ends, or along the entire length of the test tube, the advance of each revolution can be suitably defined to be compatible with the dimensions of the sonic beam generated by ultrasonic transducer 2. Alternatively, the number of ultrasonic devices 2 may be conveniently increased in the acoustic coupling unit 3 to ensure an increase in the test sweep 11. In addition, the relative speed of displacement between the test surface of the tube 1 and the ultrasonic transducer 2 can be reduced to ensure an increase in the density of the sonic pulses, i.e. a reduction between two sonic sequential pulses.

The sonic emitting and receiving unit 9 will emit the electrical pulses at a given pulse repetition frequency up to the high frequency transducer 2 generating the sound waves which will propagate through the acoustic coupling liquid 4, perpendicularly to the external surface of the tube 1, the sound propagation continued through the thickness of the tube 1. The interface signal 14 relating to the sonic beam reflection on the outer surface of the tube and the background echo signal 15 relating to the reflection of the sonic beam on the inner surface of the tube will be represented in the sonic receiving and receiving unit 9. Possible inclusions in the test volume may result in a reflection signal 13 between the interface signals 14 of the bottom echo 15, depending on whether they have acoustic impedance different from the steel being evaluated, and the height of the reflection signal (amplitude) of the inclusions conditioned to the adjustment of the test sensitivity and characteristics of the inclusions, such as orientation, morphology and size.

The test sensitivity shall be established using "Flat Bottom Hole" type artificial reflectors machined on the inner surface of tube 1, which shall be machined into a reference tube having the same nominal dimensions and acoustic characteristics of the material to be tested. The evaluated volume will be set as a function of the width of the monitoring threshold 12 of inclusion signals, having as large a width as possible, considering its start as close as possible to the signal corresponding to the interface signal 14 (external surface of the tube 1 under inspection) and its termination as close as possible to the signal corresponding to the background echo signal 15 (signal corresponding to the inner surface of the tube 1 under inspection). In addition, the test sensitivity will also be defined by the height of the inclusion threshold monitoring threshold, and should be adjusted preferably between 30% and 50% of the total screen height.

The presence of general macroinclusions is inherent in the steel fabrication process and only the inclusion reflection signals with amplitudes above the monitoring threshold 12 will be accounted for to determine the impurity factor of the steel. The impurity factor will be defined as a function of the amount of sonic pulses with inclusion reflection signals with amplitudes above the monitoring threshold 12 by the total amount of sonic pulses emitted during the test. A multiplying factor of the occurrences of inclusion reflection signals with amplitudes above the monitoring threshold 12 can be applied to define different weights according to the application and criticality of the product. The impurity factor of the steel shall be calculated by the following formula.

$$FI[\%] = 100 \times \left[ A \times \frac{N_{Ind.}}{N_{Pulsos}} \right]$$

wherein:
FI=Impurity factor (Index of inclusions);
$N_{Pulses}$=Total amount of pulses emitted in the volume tested;
$N_{Ind}$=Amount of signals with amplitudes above the monitoring threshold; and
A=Multiplier factor for signals with amplitudes above the monitoring threshold.

The impurity factor can be calculated at each revolution (turn) or fraction of length of the test tube, and/or considering any test sweep 11 along the length tested. In the case of the length fraction of the test tube, for example, the impurity factor can be assigned to the specified regions, for example one or both ends, or in specific regions along the length of the tube.

After the ultrasonic transducer 2 detects inclusion information during the test sweep 11 of the tube 1, the amplitude values found are sent to the emission and reception unit of the sonic pulses 9, which in turn will determine the impurity factor from the steel to that particular pipe or region. In addition, the Result of Total Impurity Factor can be attributed to the batch of tubes produced in the campaign.

After evaluation of the inclusions in the tested tube 1, the acoustic coupling unit 3 moves away from the tube 1 and the transport bed 10 will initiate a new test cycle by withdrawing the test tube and feeding the next tube from the inspection line.

Thus, the method for assessing the level of inclusions in steel tubes using high frequency transducer in the automatic ultrasonic inspection of the present invention comprises a first step of transporting the tube through the bed 10 to the acoustic coupling unit. The speed of tube transportation through the bed 10 may be adjusted to ensure the stabilization of the acoustic coupling in the ends and along the length of the tube.

Next, it is performed a step of coupling the acoustic coupling unit with the tube through a radial movement 16 of transducer approximation regarding the tube external surface.

After coupling, it is performed a step of detecting inclusions information in at least one sweep region 11 along the length of the tube. The sweep region 11 is defined by the region where the test sweep 11 is performed and may be a specific region or a helical trajectory along the whole length of the tube. But the detection of inclusions information is performed by outputting a sonic beam by the ultrasonic transducer, which performs the detection of inclusions information and may operate a nominal frequency preferably of 15 MHz.

Next, the inclusions information is sent to the sonic emitting and receiving unit. This inclusions information is defined by the number of sonic pulses with signals with amplitudes above the monitoring threshold of inclusions.

The method also comprises a step of determining the inclusions index for the tube or specific region based on the amplitudes of the signals of inclusions with amplitudes above the monitoring threshold of the signals of inclusions. The inclusions index is determined by the emitting and receiving unit of sonic pulses.

Finally, the tube transportation continues in an inspection line and the inspection cycle continues with the next tube in the production flow.

In addition, the individual results of the pipe inclusion indices are correlated with the processing conditions in the steel manufacturing stage, representing a tool for monitoring the steel purity and continuous improvement in the steel-making process.

The individual results of the pipe inclusion indices are also correlated with the corrosion test results required by pipe manufacturing and supply standards, representing a tool for monitoring and improving the corrosion resistance of steel.

No previously known method was able to provide in a simple and efficient manner the provision of a single tube inclusion index tested during the production and inspection process, not limited to a small sample of the total volume of steel produced, to dispense with the need for sampling and additional laboratory tests.

Having described a preferred embodiment example, it should be understood that the scope of the present invention encompasses other possible variations, being limited only by the content of the claims only, including possible equivalents thereto.

REFERENCES LIST

1—Inspection tube
2—Ultrasonic transducer
3—Acoustic coupling unit
4—Liquid of acoustic coupling
5—Transport rolls
6—Displacement of the tube in the axial direction
7—Displacement of the acoustic coupling unit in the axial direction
8—Rotational movement of the tube over the transportation bed
9—Emitting and receiving unit
10—Bed of tube transportation
11—Test sweep
12—Monitoring threshold
13—Sign of reflection
14—Interface signal
15—Background echo signal
16—Transducer movement in the radial direction of the tube

What is claimed is:

1. A method for assessing a level of inclusions in steel tubes during a production flow using a high frequency transducer in an automatic ultrasonic inspection, the method comprising:
(a) transporting a tube through a bed to an acoustic coupling unit in an inspection line of the production flow, wherein at least one ultrasonic transducer outputting a sonic beam is arranged in the acoustic coupling unit;
(b) coupling the acoustic coupling unit with the tube through a radial movement approximating the transducer in relation to an external surface of the tube;
(c) detecting inclusions information in at least one sweep region along a length of the tube;
(d) sending the inclusions information to a sonic emitting and receiving unit;
(e) determining an inclusions index for the tube or specific region, wherein the sonic emitting and receiving unit determines the inclusions index through the relation of a sum of sonic pulses with signals above a monitoring threshold of inclusions indications by summing the total sonic pulses emitted in the tested length based on the formula:

$$FI[\%] = 100 \times \left[ A \times \frac{N_{Ind.}}{N_{Pulsos}} \right]$$

wherein:
FI=Impurity factor (Index of inclusions);
$N_{Pulses}$=Total amount of pulses emitted in the volume tested;
$N_{Ind}$=Amount of signals with amplitudes above the monitoring threshold; and
A=Multiplier factor for signals with amplitudes above the monitoring threshold;
(f) continuing the transportation of the tube in the inspection line of the production flow; and
(g) successively conducting steps (a) to (f) with subsequent tubes in the production flow,
wherein a test sensitivity for the inclusions index is defined using artificial reflectors machined in an internal surface of the tube, and
wherein artificial reflectors are also machined in a reference tube having substantially similar nominal dimensions of the tube and substantially similar acoustic characteristics of a material to be tested of the tube, for comparison to the artificial reflectors machined in the internal surface of the tube.

2. The method, according to claim 1, wherein a speed of the transportation of the tube through the bed may be set to ensure a stabilization of the acoustic coupling in ends of the tube and along the length of the tube.

3. The method, according to claim 1, wherein the detection of inclusions information is performed by outputting a sonic beam by the at least one ultrasonic transducer.

4. The method, according to claim 1, wherein the at least one ultrasonic transducer performs the detection of inclusions information operating a nominal frequency of 15 MHz.

5. The method, according to claim 1, wherein the sweep region is a specific region or a helical trajectory along the whole length of the tube.

6. The method, according to claim 1, wherein the inclusions information is defined by a number of sonic pulses with signals with amplitudes above a monitoring threshold of inclusions.

7. The method, according to claim 1, wherein the sonic emitting and receiving unit determines the inclusions index for the tube based on amplitudes of signals of inclusions with amplitudes above a monitoring threshold.

8. The method, according to claim 1, wherein the artificial reflectors comprise a hole with a flat bottom.

9. The method, according to claim 1, wherein individual results of inclusion indices of the tubes are correlated with processing conditions in the steel manufacturing stage, representing a tool for monitoring a degree of purity of steel and continuous improvement in a steelmaking process.

10. The method, according to claim 1, wherein individual results of inclusion indices of the tubes are correlated with results of corrosion tests required by manufacturing and supply standards of the tubes, representing a tool for monitoring and improving corrosion resistance of the steel.

11. A method for assessing a level of inclusions in steel tubes during a production flow using a high frequency transducer in an automatic ultrasonic inspection, comprising:
(a) transporting a tube through a bed to an acoustic coupling unit, wherein at least one ultrasonic transducer outputting a sonic beam is arranged in the acoustic coupling unit;
(b) coupling the acoustic coupling unit with the tube through a radial movement approximating the transducer in relation to an external surface of the tube;
(c) detecting inclusions information in at least one sweep region along a length of the tube;
(d) sending the inclusions information to a sonic emitting and receiving unit;
(e) determining an inclusions index for the tube or specific region, wherein the sonic emitting and receiving unit determines the inclusions index for the tube based on amplitudes of signals of inclusions with amplitudes above a monitoring threshold, and wherein the sonic emitting and receiving unit determines the inclusions index through the relation of a sum of sonic pulses with signals above a monitoring threshold of inclusions indications by summing the total sonic pulses emitted in the tested length based on the formula:

$$FI[\%] = 100 \times \left[ A \times \frac{N_{Ind}}{N_{Pulses}} \right]$$

wherein:
FI=Impurity factor (Index of inclusions);
$N_{Pulses}$=Total amount of pulses emitted in the volume tested;
$N_{Ind}$=Amount of signals with amplitudes above the monitoring threshold; and
A=Multiplier factor for signals with amplitudes above the monitoring threshold;
(f) continuing the transportation of the tube in an inspection line; and
(g) successively conducting steps (a) to (f) with subsequent tubes in the production flow,
wherein a test sensitivity for the inclusions index is defined using artificial reflectors machined in an internal surface of the tube, and
wherein artificial reflectors are also machined in a reference tube having substantially similar nominal dimensions of the tube and substantially similar acoustic characteristics of a material to be tested of the tube, for comparison to the artificial reflectors machined in the internal surface of the tube.

12. A method for assessing a level of inclusions in steel tubes during a production flow using a high frequency transducer in an automatic ultrasonic inspection, comprising:
(a) transporting a tube through a bed to an acoustic coupling unit, wherein at least one ultrasonic transducer outputting a sonic beam is arranged in the acoustic coupling unit;
(b) coupling the acoustic coupling unit with the tube through a radial movement approximating the transducer in relation to an external surface of the tube;
(c) detecting inclusions information in at least one sweep region along a length of the tube, wherein the detection of inclusions information is performed by outputting a sonic beam by the at least one ultrasonic transducer, and wherein the inclusions information is defined by a number of sonic pulses with signals with amplitudes above a monitoring threshold of inclusions;
(d) sending the inclusions information to a sonic emitting and receiving unit;
(e) determining an inclusions index for the tube or specific region, wherein the sonic emitting and receiving unit determines the inclusions index through the relation of a sum of sonic pulses with signals above a monitoring threshold of inclusions indications by summing the total sonic pulses emitted in the tested length based on the formula:

$$FI[\%] = 100 \times \left[ A \times \frac{N_{Ind}}{N_{Pulses}} \right]$$

wherein:
FI=Impurity factor (Index of inclusions);
$N_{Pulses}$=Total amount of pulses emitted in the volume tested;
$N_{Ind}$=Amount of signals with amplitudes above the monitoring threshold; and
A=Multiplier factor for signals with amplitudes above the monitoring threshold;
(f) continuing the transportation of the tube in an inspection line; and
(g) successively conducting steps (a) to (f) with subsequent tubes in the production flow,
wherein a test sensitivity for the inclusions index is defined using artificial reflectors machined in an internal surface of the tube, and
wherein artificial reflectors are also machined in a reference tube having substantially similar nominal dimensions of the tube and substantially similar acoustic characteristics of a material to be tested of the tube, for comparison to the artificial reflectors machined in the internal surface of the tube.

13. The method of claim 11, wherein the artificial reflectors comprise a hole with a flat bottom.

14. The method of claim 12, wherein the artificial reflectors comprise a hole with a flat bottom.

* * * * *